(12) United States Patent
Jaber

(10) Patent No.: US 6,339,036 B1
(45) Date of Patent: Jan. 15, 2002

(54) LOW ALUMINUM AND MAGNESIUM Z-N SOLUTION CATALYSTS

(75) Inventor: Isam Jaber, Calgary (CA)

(73) Assignee: Nova Chemicals (International) S.A., Calgary (CA)

(*) Notice: Subject to any disclaimer, the term of this patent is extended or adjusted under 35 U.S.C. 154(b) by 0 days.

(21) Appl. No.: 09/604,716

(22) Filed: Jun. 27, 2000

Related U.S. Application Data

(62) Division of application No. 09/239,079, filed on Jan. 27, 1999, now Pat. No. 6,130,300.
(51) Int. Cl.$^7$ .............................. B01J 31/38; C08F 4/52
(52) U.S. Cl. ..................... 502/117; 502/104; 502/132; 502/133; 526/124.5; 526/124.7; 526/125.2; 526/125.7; 526/148; 526/348.6; 526/352
(58) Field of Search ................................. 526/348, 352, 526/110, 124.5, 124.7, 125.2, 125.7, 148, 348.6; 502/104, 117, 132, 133

(56) References Cited

U.S. PATENT DOCUMENTS 5,589,555 A * 12/1996 Zboril et al. .................. 526/64

FOREIGN PATENT DOCUMENTS

EP 0 280 353 A1 * 8/1998

* cited by examiner

*Primary Examiner*—David W. Wu
*Assistant Examiner*—R. Harlan
(74) *Attorney, Agent, or Firm*—Kenneth H. Johnson

(57) ABSTRACT

The present invention provides a Ziegler-Natta catalyst useful in solution processes for the polymerization of olefins having a low amount of aluminum and magnesium. The catalysts of the present invention have a molar ratio of magnesium to the first aluminum component from 4.0:1 to 5.5:1 and molar ratio of magnesium to transition metal from 4.0:1 to 5.5:1.

11 Claims, No Drawings

LOW ALUMINUM AND MAGNESIUM Z-N SOLUTION CATALYSTS

This is a division of application Ser. No. 09/239,079, filed Jan. 27, 1999, now U.S. Pat. No. 6,130,300.

FIELD OF THE INVENTION

The present invention relates to new catalyst systems for the polymerization of olefins. The catalyst system comprises a mixture of (i) an aluminum alkyl compound and a dialkyl magnesium compound; (ii) an alkyl halide; (iii) a transition metal halide; and (iv) a dialkyl aluminum alkoxide. The catalyst systems are particularly useful as catalysts systems used in the solution polymerization of olefins and particularly for the polymerization of co- and homopolymers of ethylene.

BACKGROUND OF THE INVENTION

U.S. Pat. No. 5,589,555 (Zboril et al. issued Dec. 31, 1996) and U.S. Pat. No. 5,519,098 (Brown et al. issued May 21, 1996) both assigned to Novacor Chemicals (International) S.A. (now NOVA Chemicals (International) S.A.) disclose catalysts for the solution polymerization of alpha olefins. The patents disclose a catalyst system comprising:

(i) a mixture of a trialkyl aluminum compound and a dialkyl magnesium compound;
(ii) a reactive chloride which may be an alkyl halide;
(iii) a transition metal compound; and
(iv) the reaction product of a trialkyl aluminum compound and an alcohol in amounts up to about stoichiometric amounts to produce a dialkyl aluminum alkoxide.

The present invention has removed the step in the process of the above patents of the reaction of a trialkyl aluminum compound with an alcohol. In these prior patents the molar ratio of aluminum (the first addition $Al^1$) to transition metal is 0.9. The ratio of halide to magnesium is from 1.9:1 to 2.6:1. The ratio of aluminum (second addition—the reaction product of the trialkyl aluminum and alcohol) to transition metal is at least 3:1. The above patents do not disclose a catalyst system in which the mole ratio of the second addition of aluminum to transition metal is below 3:1, more particularly in the range from 1.2:1 to 2:1.

U.S. Pat. No. 4,097,659 issued Jun. 27, 1978 to Creemers et al. and assigned to Stamicarbon, N. V. (now expired), discloses a process for producing polyolefins in which a precursor is prepared by reacting an aluminum alkyl halide of the formula $R_m AlX_{3-m}$ with an organomagnesium compound of the formula $MgR'_2$ wherein m is a value less than 3. That is, the aluminum compound may have 1, 2 or 3 halogen atoms; and R and R' independently may be a $C_{1-30}$ hydrocarbyl radical. The Creemers patent does not teach or suggest that the first component could be the reaction product of a trialkyl aluminum compound and a dialkyl magnesium compound. In fact, the patent teaches against such a system as illustrated by the comparative example in which the first component is prepared by reacting trimethyl aluminum and dibutyl magnesium. The resulting reaction product is then reacted with a transition metal compound. The molar ratio of magnesium and aluminum to transition metal may be from between 0.1:1 and 10:1. The resulting precursor is then activated with an organoaluminum activator selected from the group consisting of trialkyl aluminum, an alkyl aluminum halide and an alkyl aluminum hydride. Creemers does not teach nor suggest the activator could be a dialkyl aluminum alkoxide. In short, the patent teaches away from the subject matter of the present invention.

European patent application 0 280 353 in the name of Coosemans et al., assigned to Stamicarbon B. V., published 31.08.88, teaches a two component catalyst system for the solution polymerization of olefins. The first component comprises a mixture of one or more magnesium compounds, one or more aluminum compounds and one or more transition metal compounds, optionally in the presence of a halogen containing compound. The second component is an activator which is an organoaluminum compound of the formula $R^1_m Al\ X_{3-m}$. In the first component the ratio of Al:Mg is greater than 1 (claim 1 and page 2 line 26). In the catalysts of the present invention the ratio of magnesium to aluminum is from 4.0:1 to 5.5:1 (therefore the ratio of aluminum to magnesium is from 0.25:1 to 0.18:1) which is well below that specified in the Coosemans patent. Additionally, in component 1 of Coosemans the ratio of Al:transition metal is at least 3:1 (claim 1) while in the present composition the ratio of aluminum to transition metal is from about 1:1 to 1.3:1. In view of the foregoing the Coosemans patent teaches away from the subject matter of the present invention.

U.S. Pat. No. 4,314,912 issued Feb. 9, 1982 to Lowery, Jr. et al., assigned to The Dow Chemical Company teaches a catalyst which is a reaction product of a transition metal, an organomagnesium compound, a non-metallic monohalide (x=halide). In the catalyst the ratio of Mg: Transition metal is from 5:1 to 2000:1; Mg:X is from 0.1:1 to 1:1 (e.g. 1:10 to 1:1) and the ratio X: transition metal is from about 40:1 to 2000:1. In the catalysts of the present invention the ratio of X to Mg is about 2:1 and the ratio of Mg: transition metal is about 5:1. Accordingly the ratio of X to transition metal is about 10:1 which is well below the amount specified in the Lowery patent.

The present invention seeks to provide a catalyst useful in high temperature solution polymerization.

SUMMARY OF THE INVENTION

Accordingly, the present invention seeks to provide a catalyst consisting essentially of:

(i) a mixture of an alkyl aluminum compound of the formula $(R^1)_3Al$ and $(R^2)_2Mg$, wherein $R^1$ is a $C_{1-10}$ alkyl radical and $R^2$ is a $C_{1-10}$ alkyl radical in a molar ratio of Mg to Al from 4.0:1 to 5.5:1;

(ii) a halide of the formula $R^3X$, wherein $R^3$ is a $C_{1-10}$ alkyl radical and x is a halide selected from the group consisting of chlorine and bromine;

(iii) titanium tetrachloride; and (iv) an alkyl aluminum alkoxide compound of the formula $(R^4)_2AlOR^5$, wherein $R^4$ and $R^5$ are independently selected from the group consisting of $C_{1-10}$ alkyl radicals to provide: a molar ratio of Mg:Ti from 4:1 to 5.5:1; a molar ratio of aluminum alkyl to titanium tetrachloride from 1:1 to 1.5:1; a molar ratio of halide to Mg from 1.9:1 to 2.5:1; and a molar ratio of alkyl aluminum alkoxide to titanium from 1.2:1 to 2:1.

In a further embodiment, the present invention provides a process for the polymerization of a mixture consisting of at least 50 weight % of ethylene and up to 50 weight % of one or more $C_{3-12}$ olefins comprising contacting said monomer mixture in a hydrocarbon solvent at a temperature from 105° C. to 320° C. and a pressure from 4 to 20 mPa under conditions to maintain the polymer in solution with a catalyst consisting essentially of:

(i) a mixture of an alkyl aluminum compound of the formula $(R^1)_3Al$ and $(R^2)_2Mg$, wherein $R^1$ is a $C_{1-10}$ alkyl radical and $R^2$ is a $C_{1-10}$ alkyl radical in a molar ratio of Mg to Al from 4.0:1 to 5.5:1;

(ii) a halide of the formula $R^3X$, wherein $R^3$ is a $C_{1-8}$ alkyl radical and x is a halide selected from the group consisting of chlorine and bromine;

(iii) titanium tetrachloride; and (iv) an alkyl aluminum alkoxide compound of the formula $(R^4)_2AlOR^5$, wherein $R^4$ and $R^5$ are independently selected from the group consisting of $C_{1-10}$ alkyl radicals to provide: a molar ratio of Mg:Ti from 4:1 to 5.5:1; a molar ratio of aluminum alkyl to titanium tetrachloride from 1:1 to 1.5:1; a molar ratio of halide to Mg from 1.9:1 to 2.5:1; and a molar ratio of alkyl aluminum alkoxide to titanium from 1.2:1 to 2:1.

BEST MODE

There are a number of types of polymers of alpha olefins which may be made. For example, the polymer may be a liquid polymer or a waxy polymer having a low molecular weight. On the other hand, the polymer may have a very high molecular weight and have excellent physical properties but may be difficult to process. The present invention is directed "useful" polymers of alpha olefins in practical terms the polymer should have a melt index as determined by ASTM D 1238 (190° C./2.16 kg) of up to 200 dg/min. ASTM means the American Standard Test Method and the conditions of the test are at 190° C. and under a load of 2.16 kg. While the melt index may be fractional the lowest melt index would be that useful for extrudable polymers. Typical ranges would include melt indexes from 0.1 to 150, most typically from 0.1 to 120 dg/min.

The process of the present invention may be used to prepare homopolymers of ethylene and copolymers of ethylene and higher alpha-olefins having densities in the range of, for example, about 0.900–0.970 g/cm$^3$ and especially 0.910–0.965 g/cm$^3$; the polymers of higher density, e.g. about 0.960 and above, being homopolymers. Such polymers may have a melt index, as measured by the method of ASTM D-1238, condition E, in the range of, for example, 0.1–200 dg/min, typically from about 0.1 to 150 dg/min., and especially in the range of about 0.1 to 120 dg/min. The polymers may be manufactured with narrow or broad molecular weight distribution. For example, the polymers may have a stress exponent, a measure of the molecular weight distribution, in the range of about 1.1–2.5 and especially in the range of about 1.3–2.0. Stress exponent is determined by measuring the throughput of a melt indexer at two stresses (2160 g and 6480 g loading) using the procedures of the ASTM melt index test method, and the following formula:

$$\text{Stress Exponent} = 1/(0.477) \times (\text{Log. wt extruded with 6480 g weight})/\text{wt. extruded with 2160 g wt}).$$

Stress exponent values of less than about 1.40 indicate narrow molecular weight distribution while values above about 1.70 indicate broad molecular weight distribution.

The present invention is directed to a process for the preparation of useful polymers of alpha-olefins, such polymers being intended for fabrication into articles by extrusion, injection molding, thermoforming, rotational molding and the like. In particular, the polymers of alpha-olefins are homopolymers of ethylene and copolymers of ethylene and higher alpha-olefins, i.e. alpha-olefins of the ethylene series, especially such higher alpha-olefins having 3 to 12 carbon atoms, i.e. $C_{3-12}$ alpha-olefins, examples of which include 1-butene, 1-hexene, and 1-octene. The preferred higher alpha-olefins have 4–10 carbon atoms. In addition, cyclic endomethylenic dienes may be fed to the process with the ethylene or mixtures of ethylene and $C_{3-12}$ alpha-olefin. The monomer feed typically comprises at least 40 weight % of ethylene and up to 60 weight % of one or more comonomers selected from the group consisting of $C_{3-12}$ olefins. Such polymers are known per se.

In the process of the present invention, monomer, generally one or more hydrocarbyl monomers, a coordination catalyst and inert hydrocarbon solvent and optionally hydrogen are fed to a reactor. The monomer may be ethylene or mixtures of ethylene and at least one $C_{3-12}$ alpha-olefin, preferably ethylene or mixtures of ethylene and at least one $C_{4-10}$ alpha-olefin.

The solvent used in the preparation of the coordination catalyst is an inert $C_{6-10}$ hydrocarbon which may be unsubstituted or substituted by a $C_{1-4}$ alkyl radical such as a hydrocarbon that is inert with respect to the coordination catalyst. Such solvents are known and include for example, hexane, heptane, octane, cyclohexane, methylcyclohexane, and hydrogenated naphtha. The solvent used in the preparation of the catalyst is preferably the same as that fed to the reactor for the polymerization process. Caution should be exercised in selecting a solvent as a saturated monomer is not desired as a solvent for the reaction (i.e. hexane would not be preferred solvent for a hexene containing monomer).

The process of the present invention may be practiced over a wide range of temperatures that may be used in an alpha-olefin polymerization process operated under solution conditions. For example, such polymerization temperatures may be in the range of 105° C. to 320° C., preferably in the range of 130° C. to 250° C., most preferably in the range from 140° C. to 230° C. However, one of the considerations in selecting the temperature is that the polymer should remain in solution.

The pressures used in the process of the present invention are those known for solution polymerization processes, for example, pressures in the range of about 4–20 mPa, preferably from 8 to 20 mPa.

In the process of the present invention, the alpha-olefin monomers are polymerized in the reactor in the presence of the catalyst. Pressure and temperature are controlled so that the polymer formed remains in solution.

Optionally, small amounts of hydrogen, for example 0–100 parts per million based on the total solution fed to the reactor, may be added to the feed in order to improve control of the melt index and/or molecular weight and thus aid in the production of a more uniform product, as is disclosed in Canadian Patent 703,704.

The coordination catalyst is formed from four components. The first component is a mixture of an alkyl aluminum compound of the formula $(R^1)_3Al$ wherein $R^1$ is a $C_{1-10}$, preferably a $C_{1-4}$ alkyl radical and a dialkyl magnesium compound of the formula $(R^2)_2Mg$ wherein each $R^2$ is independently (i.e. each $R^2$ may be the same or different) a $C_{1-10}$, preferably a $C_{2-6}$, alkyl radical, The molar ratio of Mg to Al in the first component may be from 4.0:1 to 5.5:1, preferably from 4.3:1 to 5.0:1. In a particularly preferred embodiment of the present invention the aluminum compound is triethyl aluminum.

The second component in the catalyst systems according to the present invention is a reactive alkyl halide (reactive halide) of the formula $R^3X$ wherein $R^3$ is a $C_{1-8}$, preferably a $C_{1-4}$, alkyl radical and X is a halide selected from the group consisting of chlorine and bromine. Preferably, the second component is t-butyl halide, most preferably t-butyl chloride.

The third component in the catalyst of the present invention is a transition metal halide of the formula $MX_4$, wherein M is a transition metal such as titanium, zirconium or hafnium, preferably titanium and X is a halide, preferably chloride. Preferably the transition metal halide is $TiCl_4$.

The fourth component in the catalyst of the present invention is an alkyl aluminum alkoxide of the formula $(R^4)_2AlOR^5$ wherein $R^4$ and $R^5$ are independently selected from the group consisting of $C_{1-8}$, preferably $C_{1-4}$ alkyl radicals. A useful dialkyl aluminum alkoxide is diethyl aluminum ethoxide.

The components of the catalyst system be mixed to provide a molar ratio of Mg:Ti from 4:1 to 5.5:1, preferably from 4.3:1 to 5.0:1; a molar ratio of aluminum alkyl to transition metal halide from 1:1 to 1.5:1, preferably from 1:1 to 1.3:1; a molar ratio of (reactive) halide to Mg from 1.9:1 to 2.5:1, preferably from 2:1 to 2.3:1 and a molar ratio of alkyl aluminum alkoxide to titanium from 1.2:1 to 2:1, preferably from 1.2:1 to 1.8:1.

While all of the components of the catalyst system may be mixed together at once, generally the first components are mixed together, optionally at room temperature to form a precursor which is activated by the fourth component.

In a further embodiment of the present invention all of the components of the catalyst or a preformed precursor which may be prepared by inline mixing (typically from one to two minutes) at a temperature of about 30° C.

The catalyst system of the present invention is used in the process of the invention without separation of any of the components of the catalyst. In particular, neither liquid nor solid fractions are separated from the catalyst before it is fed to the reactor. In addition, the catalyst and its components are not slurries. All the components are easy-to-handle, storable stable liquids.

The solvent containing monomers, catalyst or catalyst components, and optionally hydrogen are fed to the reactor and react under good mixing conditions for a short period of time, preferably less than 10 minutes.

The solution passing from the polymer on reactor is normally treated to deactivate any catalyst remaining in the solution. A variety of catalyst deactivators are known, examples of which include fatty acids, alkaline earth metal salts of aliphatic carboxylic acids and alcohols. The hydrocarbon solvent used for the deactivator is preferably the same as the solvent used in the polymerization process. If a different solvent is used, it must be compatible with the solvent used in the polymerization mixture and not cause adverse effects on the solvent recovery system associated with the polymerization process. The solvent may then be flashed off from the polymer, which subsequently may be extruded into water and cut into pellets or other suitable comminuted shapes. The recovered polymer may then be treated with saturated steam at atmospheric pressure to, for example, reduce the amount of volatile materials and improve polymer color. The treatment may be carried out for about 1 to 6 hours, following which the polymer may be dried and cooled with a stream of air for 1 to 4 hours.

Pigments, antioxidants, UV screeners, hindered amine light stabilizers and other additives may be added to the polymer either before or after the polymer is formed into pellets or other comminuted shapes. The antioxidant incorporated into polymer obtained from the process of the present invention may, in embodiments, be a single antioxidant, e.g. hindered phenolic antioxidant, or a mixture of antioxidants, e.g. a hindered phenolic antioxidant combined with a secondary antioxidant, e.g. phosphite. Both types of antioxidant are known in the art. For example, the ratio of phenolic antioxidant to secondary antioxidant may be in the range of 0:1:1 to 5:1 with the total amount of antioxidant being in the range of 200 to 3,000 ppm.

The present invention will now be illustrated by the following non-limiting examples. Unless otherwise indicated parts means part by weight and percent (%) is weight percent. In the following examples, unless indicated otherwise, the compound to give $Al^1$ was triethyl aluminum; the magnesium compound was n-dibutyl magnesium; the transition metal compound was $TiCl_4$; the halide compound was t-butyl chloride; and the compound providing the $Al^2$ was diethyl aluminum ethoxide.

EXAMPLE 1

The following examples were conducted in a small scale continuous polymerization unit. Homopolymer of ethylene was made at 200° C. using various catalyst ratios with a ratio of chloride to magnesium from 2.14 to 2.18:1 at a constant resident time. The catalyst ratios, ethylene conversion, and melt index and density of the resulting polymer are set forth in Table 1 below.

TABLE 1

| $Al^1$/Ti molar | $Al^2$/Ti molar | Cl/Mg molar | Mg/Ti molar | Ethylene % Conv. | Melt Index g/10 min | Density g/cc |
|---|---|---|---|---|---|---|
| 1.0 | 3.45 | 2.14 | 4.03 | 95.35 | 0.47 | 0.9601 |
| 1.0 | 3.45 | 2.14 | 5.50 | 95.22 | 0.46 | 0.9615 |

The above data show that catalyst ratios of the present invention give high conversions yielding a useful polymer.

EXAMPLE 2

The following examples were conducted at pilot plant scale. Co- and homopolymers of ethylene were prepared at about 200° C. using various catalyst ratios at a constant resident time. The catalyst ratios, ethylene conversion, and melt index and density of the resulting polymer are set forth in Table 2 below. In Table 2 the first run is a homopolymer, in the other runs a copolymer was made using a feed weight ratio (e.g. on a kg basis) of ethylene to 1-octene of 2.83.

TABLE 2

| $Al^1$/Ti molar | $Al^2$/Ti molar | Cl/Mg molar | Mg/Ti molar | Ethylene % Conv. | Melt Index g/10 min | Density g/cc |
|---|---|---|---|---|---|---|
| 0.96 | 1.84 | 2.18 | 4.8 | 95.14 | 4.0 | 0.9624 |
| 1.0 | 1.73 | 2.14 | 4.95 | 93.4 | 3.0 | 0.9361 |
| 1.03 | 1.71 | 2.28 | 5.14 | 89.2 | | |
| 1.0 | 1.20 | 1.98 | 5.0 | 90.5 | 3.5 | 0.9377 |

The above data show that catalyst ratios of the present invention give high conversions yielding a useful polymer on a larger scale. The results in Tables 1 and 2 demonstrate that the performance is independent of reactor scale.

What is claimed is:

1. A catalyst consisting essentially of:
   (i) a mixture of an alkyl aluminum compound of the formula $(R^1)_3Al$ and $(R^2)_2Mg$, wherein $R^1$ is a $C_{1-10}$ alkyl radical and $R^2$ is a $C_{1-10}$ alkyl radical in a molar ratio of Mg to Al from 4.0:1 to 5.5:1;
   (ii) a halide of the formula $R^3X$, wherein $R^3$ is a $C_{1-8}$ alkyl radical and x is a halide selected from the group consisting of chlorine and bromine;
   (iii) titanium tetrachloride; and
   (iv) an alkyl aluminum alkoxide compound of the formula $(R^4)_2AlOR^5$, wherein $R^4$ and $R^5$ are independently selected from the group consisting of $C_{1-10}$ alkyl radicals to provide: a molar ratio of Mg:Ti from 4:1 to 5.5:1; a molar ratio of aluminum alkyl to titanium tetrachloride from 1:1 to 1.5:1; a molar ratio of halide to Mg from 1.9:1 to 2.5:1; and a molar ratio of alkyl aluminum alkoxide to titanium from 1.2:1 to 2:1.

2. The catalyst according to claim 1, wherein in component (i) the molar ratio of Mg:Al is from 4.3:1 to 5.0:1.

3. The catalyst according to claim 2, wherein the molar ratio of Mg:Ti is from 4.3:1 to 5.0:1.

4. The catalyst according to claim 3, wherein the molar ratio of aluminum alkyl to titanium tetrachloride is from 1:1 to 1.3:1.

5. The catalyst according to claim 4, wherein the molar ratio of halide to Mg is from 2:1 to 2.3:1.

6. The catalyst according to claim 5, wherein the molar ratio of alkyl aluminum alkoxide to titanium is from 1.2:1 to 1.8:1.

7. The catalyst according to claim 6, wherein $R^1$, $R^3$, $R^4$ and $R^5$ are independently selected from the group consisting of $C_{1-4}$ alkyl radicals.

8. The catalyst according to claim 7, wherein $R^1$ is an ethyl radical.

9. The catalyst according to claim 8, wherein $R^2$ is a $C_{2-6}$ alkyl radical.

10. The catalyst according to claim 9, wherein $R^3$ is a tertiary butyl radical.

11. The catalyst according to claim 10, wherein $R^4$ and $R^5$ are ethyl radicals.

* * * * *